United States Patent

[11] 3,588,401

[72] Inventor Charles O. Berryman
 Detroit, Mich.
[21] Appl. No. 850,267
[22] Filed Aug. 14, 1969
[45] Patented June 28, 1971
[73] Assignee Eaton Yale & Towne Inc.
 Cleveland, Ohio
 Continuation of application Ser. No.
 662,137, Aug. 21, 1967, now abandoned.

[54] INVERTED PENDULUM OSCILLATING
 CONTROLLER IMPACT SWITCH WITH
 DECREASING RETURNING FORCES ACTING
 UPON THE PENDULUM AS IT PIVOTS FROM ITS
 NORMAL POSITION
 3 Claims, 3 Drawing Figs.
[52] U.S. Cl. .................................................. 200/61.48,
 200/61.45
[51] Int. Cl. .................................................... H01h 35/14
[50] Field of Search............................................ 200/153.22

[56] References Cited
 UNITED STATES PATENTS
 1,125,745 1/1915 Scott ........................... 200/153.22
 2,833,878 5/1958 Dawson ....................... 200/61.5
 3,005,073 10/1961 Reiss et al. .................. 200/153.22
 FOREIGN PATENTS
 909,571 5/1946 France ......................... 200/153.22

Primary Examiner—Robert K. Schaefer
Assistant Examiner—Robert A. Vanderhye
Attorney—Yount, Flynn and Tarolli ABSTRACT: A switch mechanism in which a biasing spring is connected to a movable member whose inertia actuates the switch through a connection whose mechanical advantage decreases as the movable member moves relative to its support toward a switch operated position and in which the total forces opposing movement to the switch operating position decrease as the movable member approaches a position in which the switch is operated. This decreasing mechanical advantage is a result of connecting a nonextensible means to the movable member at a point spaced from the planar surface and outwardly of the center of gravity of the movable member. The movable member may move in a plurality of directions.

PATENTED JUN28 1971

3,588,401

INVENTOR.
CHARLES O. BERRYMAN
BY
Yount, Raney, Flynn and Tarolli
ATTORNEYS

INVERTED PENDULUM OSCILLATING CONTROLLER IMPACT SWITCH WITH DECREASING RETURNING FORCES ACTING UPON THE PENDULUM AS IT PIVOTS FROM ITS NORMAL POSITION

This application is a continuation of application Ser. No. 662,137, filed Aug. 21, 1967, now abandoned.

The present invention relates to a switch which is actuated in response to a given rate of change in velocity and particularly to such a switch for use on vehicles and the like to sense collisions and effect a control operation in response thereto.

An object of the present invention is to provide a new and improved switch mechanism in which a movable member whose inertia effects operation of the switch in response to a given rate of change of velocity is movable in a plurality of directions to respond to changes of velocity in different directions and in which movement of the movable member in any of its directions is opposed by an applied force acting on the movable member which decreases in magnitude as the member moves from its at rest position toward a position in which the switch is actuated.

A further object of the present invention is to provide an inertia-operated switch in which a movable member whose inertia effects actuation of the switch upon a given rate of change in velocity is moved from a normal at rest position relative to its support to actuate the switch against a force which operates through a connection such that the mechanical advantage of the connection decreases and the total forces opposing relative movement of the movable member decrease as the movable member moves away from its normal at rest position toward a position for actuating the switch.

Still another object of the present invention is to provide a new and improved inertia-operated switch in which a movable member whose inertia effects actuation of the switch in response to a given rate of change in velocity of the switch is moved from a normal at rest position relative to its support to actuate the switch against a force which operates through a connection to urge the movable member to its at rest position and oppose movement therefrom with the connection providing a decreasing mechanical advantage as the member moves from its rest position such that the total force opposing movement of the member is decreased as it approaches its switch operated position, the movable member preferably being responsive to changes in velocity in a plurality of different directions and the forces opposing movement of the movable member in the various directions being essentially uniform and decreasing in a common manner.

Still another object of the present invention is to provide a new and improved inertia-operated switch in which a movable member is rocked relative to its support from a rest position in response to predetermined changes in velocity and a biasing means urges the member to a rest position and yieldably opposes movement therefrom and acts through a decreasing moment arm as the mass moves toward a position in which the switch is operated and thereby effects a decrease in the total force opposing movement of the mass.

A still further object of the present invention is to provide a new and improved inertia-operated switch in which a movable member which is moved by inertia relative to its support to operate the switch is supported for rocking movement in a plurality of directions with the member rocking about a plurality of different points on the periphery of the member depending upon the direction of rocking movement, and a biasing force for urging the movable member to a rest position and opposing movement therefrom acts through a force transmitting connection which lies inwardly of the movable member from the fulcrum points and extends generally perpendicular to the plane of the fulcrum points so that the biasing means opposes the movement of the movable member with maximum force when the movable member is in its rest position and with a lesser force as the member moves relative to its support toward a position in which the switch is actuated.

It is a further object of the present invention to provide a new and improved inertia-operated switch for sensing changes in velocity in which a tubular member which has a mass whose inertia is to actuate the switch has a transverse surface which has a free abutting engagement with a support surface to support the member for rocking movement about the periphery edge of the transverse surface in any of a plurality of directions and which is yieldably urged to a position where the transverse surface is in maximum abutting engagement with the support surface by a biasing means which is connected to bias the member to its rest position and to yieldably oppose movement therefrom by a connection which lies along the centerline of the tubular member.

A still further object of the present invention is to provide a new and improved inertia-operated switch as in the preceding object in which the movable member includes a weight which is moved along the tubular member toward and away from the transverse surface to adjust the sensitivity of the switch.

A still further object of the present invention is to provide a new and improved inertia-operated switch in which a tubular member has a mass provided in part by a weight which effects actuation of the switch due to the inertia of the mass upon given changes in velocity of the switch, the tubular member rocking about one end so that the outer periphery of the end functions as a fulcrum and being urged to a normal at rest position in which it extends vertically upwardly from its support by a biasing means which operates through a rod lying approximately along the centerline of the tubular member and connected to the member to pull downwardly thereon to urge it to its normal at rest position and to oppose rocking movement to a switch actuated position, the force transmitting connection being arranged so that the effective force by the biasing means opposing movement of the movable member decreases as the member rocks toward a switch actuated position.

Further objects and advantages of the present invention will be apparent from the following detailed description of the preferred embodiment made with reference to the accompanying drawings forming a part of the present specification for all material disclosed therein in which.

Figure 1:
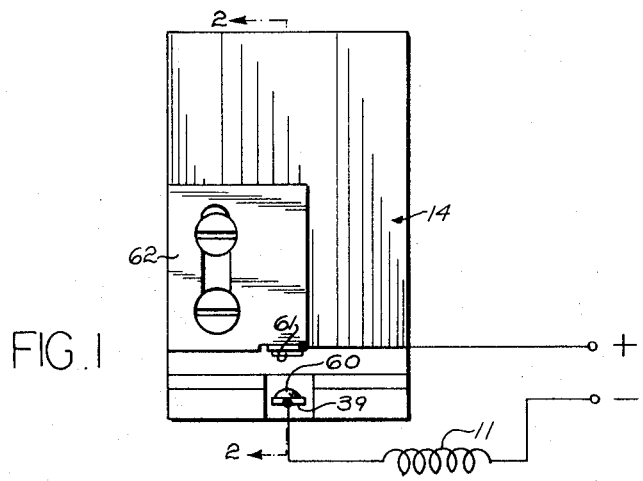
FIG. 1 is an elevational view of an inertia-operated switch embodying the present invention and schematically showing the switch connected into an electrical circuit.

Referring to FIG. 1, the inertia-operated switch of the present invention may be used to energize a control element to perform a control operation in response to a sudden change in velocity and is shown as controlling the energization of a coil 11 which effects the control operation.

Figure 2:
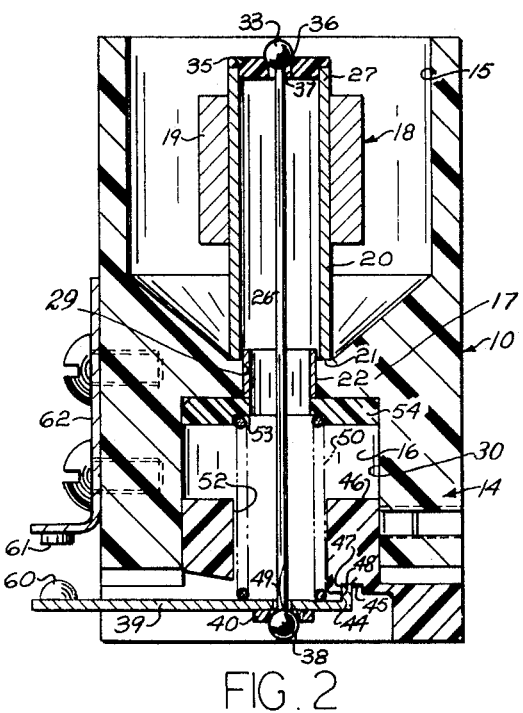
FIG. 2 is an enlarged cross-sectional view taken approximately along line 2–2 of FIG. 1.

The preferred form of the inertia switch is illustrated in FIG. 2 and as shown therein comprises a housing or casing 14 of plastic or rubber insulating material adapted to be mounted on a vehicle or other moving body. The housing has upper and lower openings 15, 16 respectively opening into its top and bottom sides and which are separated by an intermediate wall 17. A movable member 18, having a mass whose inertia is to operate the switch, is disposed in the upper opening 15 and comprises an annular weight 19 mounted on a cylindrical tube 20. The lower end 22 of the tube 20 abuts a generally horizontal planar portion 21 of the intermediate wall 17 to support the tube and the weight 19 in the casing. The lower end of the tube 20 merely rests on the planar portion 21 and the tube and the weight are adapted to rock about the outer circumferential edge of the end 22 of the tube 20.

The tube 20 and the weight 19 are normally yieldably held in their vertical position, where the axis of the weight 19 and tube 20 is disposed vertically and lies along the centerline of the casing 14, by a cable or a metal tie rod 26. The tie rod 26 extends from the upper end 27 of the tube 20 downwardly through an opening 29 in the wall 17 to extend into the bottom opening 16 in the casing 14. The bottom opening 16 opens inwardly from the bottom of the casing 14 and is disposed coaxially with the upper opening 15.

The upper end of the tie rod 26 has a ball 33 secured thereto which is received in a seat 36 in the upper side of a seat member 35 mounted in and closing the top end of the tube 20. Note that the tie rod 26 is connected to the member 118 at a point spaced from the planar surface and outwardly of the center of gravity of the inertia mass 19. The ball 33 is free to swivel in the seat to provide for limited universal angular movement of the rod 26 relative to the seat member 35 and the tube 20.

Tie rod 26 extends downwardly from the ball 33 through an opening 38 in the seat member 35 and through a switch member 39 to terminate adjacent the lower end of the casing 14. The lower end of the rod has a ball 38 fixed thereto and received in a seat element 40 on the underside of the switch member to provide for limited universal angular movement of the ball in the seat.

The switch member 39 extends generally horizontally and the right-hand end thereof, as viewed in FIG. 2, is bent to project upwardly to be received in a notch 45 in the underside of an annular member 46 disposed in the bottom opening 16 and of electrically insulating material. The upwardly turned portion 44 of the switch member 39 engages the side of the notch, designated by the reference numeral 47 which is the side closer to the tie rod 26 and is free to pivot or fulcrum about the edge of the notch designated by the reference numeral 48. Accordingly, the ball 38 is constrained to move along the arc 49 as the tie rod moves upwardly but it will be noted that this movement is essentially along the axis of the tubular member 20 when the latter is in its rest position.

The tie rod 26 and the switch member 39 are urged downwardly by a spring 50 disposed in the bottom opening 16 and received in an axial opening 52 in the annular member 46. The lower end of the spring 50 engages the upper side of the switch member 39 and the upper end of the spring is received in a recess 53 in a washer member 54 engaging the wall 17 at the upper end of the bottom opening 30.

The biasing spring 50 is coaxial with the tie rod 26 and applies a biasing force to the tie rod 26 which tends to hold the tube 20 and the weight 19 in a vertical position. When the tie rod and the tube 20 are vertical they are coaxial so that the spring provides equal forces opposing rocking movement of the weight 19 and the tube 20 in any direction. However, if there is a change in velocity of the inertia-operated switch 10, the inertia of the weight 19 and tube 20 will tend to cause the tube to rock on its lower circumferential edge in the direction which the change in velocity tends to produce movement of the mass relative to the housing. As the weight 19 and the tube 20 rock in a given direction relative to the housing 14, the tie rod 26 will move upwardly since the rocking movement is about a point on the outer peripheral edge of the end of the tube rather than a point on the axis of the tube to cause the switch member 39 to rock upwardly about the edge 48 of the notch 45. This upward movement of the switch member 39 will compress the spring 50 to increase, somewhat, the force applied by the spring 50 which tends to restore the cylindrical tube 20 and the weight 19 to the vertical position. The effective force of the spring and the total forces acting to oppose movement and to restore the weight and tube to the vertical position actually decrease in the illustrated embodiment as the weight 19 and the tube 20 rock away from their at rest position relative to the casing 14. This decrease in force is effected because the tie rod will operate through a smaller moment arm as its point of connection to the seat member 35 is displaced toward the fulcrum point as the tube rocks away from its vertical position since the tie rod is connected to the movable member at a point spaced from the planar surface and outwardly of the center of gravity of the inertia mass. During this rocking movement, the tie rod 26 will move angularly relative to the axis of the tube 20. As the tube rocks away from the vertical position it raises the lower end of the tie rod and the switch member 39 moves upwardly toward a position in which a contact member 60 on the switch member 39 engages a cooperating contact 61 on the casing 14. The contact 61 is on a switchplate 62 adjustably mounted on the casing 14 to adjust the contact spacing and the movement necessary to effect actuation of the switch.

Thus as the weight 19 and tube 20 are rocked toward a position where the contacts 60, 61 engage, which is a switch operated position for the weight 19 and tube 20, the force opposing movement of the weight 19 is effectively decreased. Not only is the force of the spring effectively decreased, but, the effect of gravity opposing movement of the mass toward the switch-operated position decreases as the mass rocks away from its at rest position relative to the housing 14.

In the preferred and illustrated embodiment, the weight 19 is adjustable axially along the length of the tube 20 to provide an adjustment for the rate of change in velocity which is necessary to operate the weight and tube to a switch-operated position in opposition to the external force applied by the spring 50 which tends to restore the weight 19 and the tube 20 to its central position coaxial with a vertical axis. The weight 19 may have a tight fit on the tube 20 and be held in position by friction or suitable locking and retaining means may be utilized to hold the mass in an adjusted position.

Figure 3:
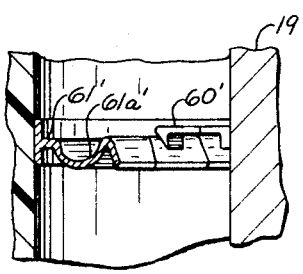
FIG. 3 is a fragmentary sectional view showing a modification of the present invention.

Referring to FIG. 3, the inertia switch may have a contact element 60' carried by the weight 19 which is adapted to engage a cooperating contact element 61' supported on the sidewall of the upper opening 15. The contact elements may be annular and the element 60' may have a periphery which is stamped to form spring fingers which engage an annular detent groove 61a opening into the upper side of the contact element 61' upon suitable rocking movement of the weight. The spring fingers and the groove may be formed as shown in the drawing to interlock when they engage each other to hold the switch in a latched position once the switch is operated. To facilitate the locking action and to provide resiliency, the contact 61' may have spaced radial slits opening into its inside edge and extending through the groove 61a. Various other latching techniques could be utilized to hold the weight 19 in a switch-operated position, as will be appreciated by those skilled in the art. For example, a part on the tube 20 or on the weight may enter a magnetic field established by permanent magnets when the weight is operated to a switch-operated position to hold the weight in that position. The magnetic field would be oriented in such a manner that it did not apply a force to the weight 19 which would disturb its normal mode of operation. Moreover, the construction could be such that the weight would move overcenter so the force of the spring 50 would act to latch the contacts.

It can now be seen that the present invention has provided a new and improved inertia-operated switch mechanism. While the preferred embodiment has been shown and described in detail, it is hereby my intention to cover all constructions, modifications, and arrangement which fall within the ability of those skilled in the art and within the scope and spirit of the appended claims.

I claim:

1. In a switch mechanism, a support, an elongated tubular member having a bore extending longitudinally thereof and said member having an inertia mass attached thereto and whose inertia is to effect movement thereof relative to said support on a given rate of change in velocity of the latter, said elongated member being supported on a planar surface on said support whereby said member may pivot in a plurality of directions in response to changes in velocity of said support in corresponding directions, force applying means for applying a moment force to said member which urges said member to a normal position, said force applying means comprising nonextensible force transmitting means received in said bore and connected to said member and spring means concentrically received over and connected to said force transmitting means, and contact means operatively connected to said nonextensible force transmitting means, said nonextensible means being connected to said member at a point spaced from the planar surface and outwardly of the center of gravity of said inertia mass whereby the force applied to said elongated member by said nonextensible means acts through a moment arm which rapidly decreases during pivoting movement of said elongated member whereby the net force acting on said member tending to return said member to a normal position rapidly decreases as said member pivots.

2. The switch mechanism of claim 1 wherein said inertia mass is adjustably attached to said elongated member whereby the effective length of said member as measured from said planar surface to said mass may be varied independent of the connection between said nonextensible means and said elongated member.

3. The switch mechanism of claim 1 wherein said nonextensible means is connected to said elongated member at the outer extremity thereof.